(12) United States Patent
Kuo et al.

(10) Patent No.: US 12,086,385 B2
(45) Date of Patent: Sep. 10, 2024

(54) SCANNING METHOD, ELECTRONIC DEVICE AND PROCESSING SYSTEM FOR MULTIPLE BARCODES

(71) Applicant: Getac Technology Corporation, New Taipei (TW)

(72) Inventors: Chun-Yu Kuo, Taipei (TW); Da-Ke Liu, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 18/177,912

(22) Filed: Mar. 3, 2023

(65) Prior Publication Data
US 2024/0070418 A1    Feb. 29, 2024

Related U.S. Application Data

(60) Provisional application No. 63/402,029, filed on Aug. 29, 2022.

(51) Int. Cl.
| | |
|---|---|
| *G06K 19/06* | (2006.01) |
| *G06F 3/0482* | (2013.01) |
| *G06F 3/0485* | (2022.01) |
| *G06K 7/14* | (2006.01) |

(52) U.S. Cl.
CPC .......... *G06F 3/0482* (2013.01); *G06F 3/0485* (2013.01); *G06K 7/1443* (2013.01); *G06K 19/06028* (2013.01)

(58) Field of Classification Search
CPC ............ G06K 7/1443; G06K 19/06028; G06F 3/0482; G06F 3/0485

USPC ..................................................... 235/462.08
See application file for complete search history.

(56) References Cited

U.S. PATENT DOCUMENTS 10,853,611 B1 *   12/2020   Cheng .................. G06K 7/1417
2013/0256416 A1   10/2013   Wang et al.

FOREIGN PATENT DOCUMENTS

| CN | 112241639 A | 1/2021 |
|---|---|---|
| CN | 113051950 A | 6/2021 |
| EP | 2093695 B1 | 10/2012 |
| TW | 201820222 A | 6/2018 |

* cited by examiner

*Primary Examiner* — Daniel A Hess
(74) *Attorney, Agent, or Firm* — McClure, Qualey & Rodack, LLP (57) ABSTRACT

A scanning method for multiple barcodes is applied in an electronic device. The electronic device loads a tag template, and the tag template has a plurality of detection zones each corresponding to a target barcode and a target barcode type. The electronic device captures a tag image with a plurality of barcode patterns to be detected, and each barcode pattern to be detected has coordinate information on an image coordinate system. The electronic device overlays the tag image with the tag template to determine whether each barcode pattern to be detected is located in one of the detection zones. When the barcode pattern to be detected is located in one of the detection zones and matches the corresponding target barcode type, the electronic device reads the barcode pattern to be detected to obtain a read result.

14 Claims, 10 Drawing Sheets

SCANNING METHOD, ELECTRONIC DEVICE AND PROCESSING SYSTEM FOR MULTIPLE BARCODES

The application claims priority to U.S. Provisional Application No. 63/402,029, filed on Aug. 29, 2022, the disclosure of which is hereby incorporated by reference herein in its entirety.

BACKGROUND OF THE INVENTION

Field of the Invention

The present disclosure relates to a barcode scanning method and device and, more particularly, to a scanning method for multiple barcodes, and an electronic device and a processing system for scanning multiple barcodes.

Description of the Prior Art

Barcode identification systems are important tools for logistics managers. A user may scan a barcode on an object by a barcode scanner so as to acquire information related to the object. On the other hand, a user may also manage inventory of a logistics database by means of scanning barcodes.

An object may go through different warehousing or inspection checkpoints during the delivery or manufacturing processes, and thus multiple barcodes may be provided on the object. However, sequentially scanning multiple barcodes is a time-consuming task for a user.

SUMMARY OF THE INVENTION

In view of the above, in some embodiments, a scanning method for multiple barcodes includes loading a tag template, the tag template having a plurality of detection zones each corresponding to a target barcode type; capturing a tag by an image capturing unit to obtain a tag image, wherein the tag image has at least one barcode pattern to be detected, and each barcode pattern to be detected has coordinate information on an image coordinate system; overlaying the tag image with the tag template, and determining, according to the coordinate information of each barcode pattern to be detected, whether the barcode pattern to be detected is located in one of the detection zones; if the barcode pattern to be detected is located in one of the detection zones and matches the corresponding target barcode type, reading the barcode pattern to be detected located in the detection zone to acquire a read result.

In some embodiments, the coordinate information includes a plurality of corner coordinates of the barcode pattern to be detected on the image coordinate system.

In some embodiments, the overlaying of the tag image with the tag template includes selecting a reference point from the tag image, selecting a corresponding point from the tag template according to the reference point, and mapping the corresponding point to the reference point such that the tag image is overlaid with the tag template.

In some embodiments, the mapping of the corresponding point to the reference point such that the tag image is overlaid with the tag template includes obtaining a scaling ratio by an electronic device, and adjusting a range in which the tag image is overlaid with the tag template by the electronic device according to the scaling ratio.

In some embodiments, the tag template further has output order information of a plurality of detection zones, and the scanning method for multiple barcodes further includes outputting all of the acquired read results according to the output order information.

In some embodiments, if the barcode pattern to be detected located in the detection zone does not match the corresponding target barcode type, the barcode pattern to be detected located in the detection zone is not read.

In some embodiments, if a partial zone of the barcode pattern to be detected is located in the detection zone, it is determined whether a coverage ratio of the partial zone to the detection zone is greater than a threshold, and if the coverage ratio is greater than or equal to the threshold and the barcode pattern to be detected located in the detection zone matches the corresponding target barcode type, the barcode pattern to be detected located in the detection zone is read to acquire the read result.

In some embodiments, if the barcode pattern to be detected located in the detection zone does not match the corresponding target barcode type, and the number of barcodes of the barcode pattern to be detected does not match a number of the corresponding target barcode, the barcode pattern to be detected located in the detection zone is not read.

In some embodiments, a combined image formed by the tag image overlaid with the tag template is displayed.

In some embodiments, a brightness level of the detection zones in which all barcode patterns to be detected that match the corresponding target barcode type in the combined image are located is higher than a brightness level of a remaining area in the combined image.

In some embodiments, an electronic device for scanning multiple barcodes includes an image capturing unit, a storage unit and a processing unit. The image capturing unit captures a tag to obtain a tag image. The tag image has at least one barcode pattern to be detected, and each barcode pattern to be detected has coordinate information on an image coordinate system. The storage unit stores a tag template and a tag reading program, wherein the tag template has a plurality of detection zones each corresponding to a target barcode type. The processing unit is electrically connected to the image capturing unit and the storage unit, and operates the tag reading program so as to overlay the tag image with the tag template, determine, according to the coordinate information of each barcode pattern to be detected, whether the barcode pattern to be detected is located in one of the detection zones, and if the barcode pattern to be detected is located in one of the detection zones and matches a target barcode type, decode the barcode pattern to be detected located in the detection zone to acquire a read result.

In some embodiments, if the barcode pattern to be detected located in the detection zone does not match the corresponding target barcode type, the processing unit does not decode the barcode pattern to be detected located in the detection zone.

In some embodiments, if a partial zone of the barcode pattern to be detected is located in the detection zone, the processing unit is configured to further determine whether a coverage ratio of the partial zone to the detection zone is greater than a threshold, and if the coverage ratio is greater than or equal to the threshold and the barcode pattern to be detected located in the detection zone matches the corresponding target barcode type, decode the barcode pattern to be detected located in the detection zone to acquire the read result.

In some embodiments, the processing unit overlays the tag image with the tag template by selecting a reference point from the tag image, selecting a corresponding point from the tag template according to the reference point, and mapping the corresponding point to the reference point.

In some embodiments, the processing unit overlays the tag image with the tag template by obtaining a scaling ratio and adjusting a range in which the tag image is overlaid with the tag template according to the scaling ratio.

In some embodiments, if the barcode pattern to be detected located in the detection zone does not match the corresponding target barcode type, and the number of barcodes of the barcode pattern to be detected does not match a number of the corresponding target barcode, the processing unit does not decode the barcode pattern to be detected located in the detection zone.

In some embodiments, a processing system for scanning multiple barcodes includes a processing unit. The processing unit is configured to perform the following steps: reading a tag template, wherein tag template has a plurality of detection zones each corresponding to a target barcode type; obtaining and analyzing a tag image, and acquiring at least one barcode pattern to be detected in the tag image, wherein each barcode pattern to be detected has coordinate information on an image coordinate system; detecting the coordinate information and an associated barcode type of each barcode pattern to be detected according to the plurality of detection zones and the target barcode type corresponding to each barcode pattern to be detected, so as to identify, from the at least one barcode pattern to be detected, at least one barcode pattern to be detected located in one of the detection zones and having a barcode type that matches the target barcode type of the located detection zone, as at least one target barcode pattern; decoding the at least one target barcode pattern to acquire information represented by each target barcode pattern; and outputting all the acquired information.

In conclusion, the scanning method, the electronic device and the processing system for multiple barcodes of any of the embodiments provide a function of simultaneously scanning multiple barcodes by using a tag template, so as to generate a read result of a barcode with absolute coordinates matching a detection zone and a format matching a corresponding target barcode type. In some embodiments, the scanning method, the electronic device and the processing system for multiple barcodes are further capable of setting an output order of the detection zones in the tag template and accordingly outputting the generated read result.

DETAILED DESCRIPTION OF THE EMBODIMENTS

Figure 1:
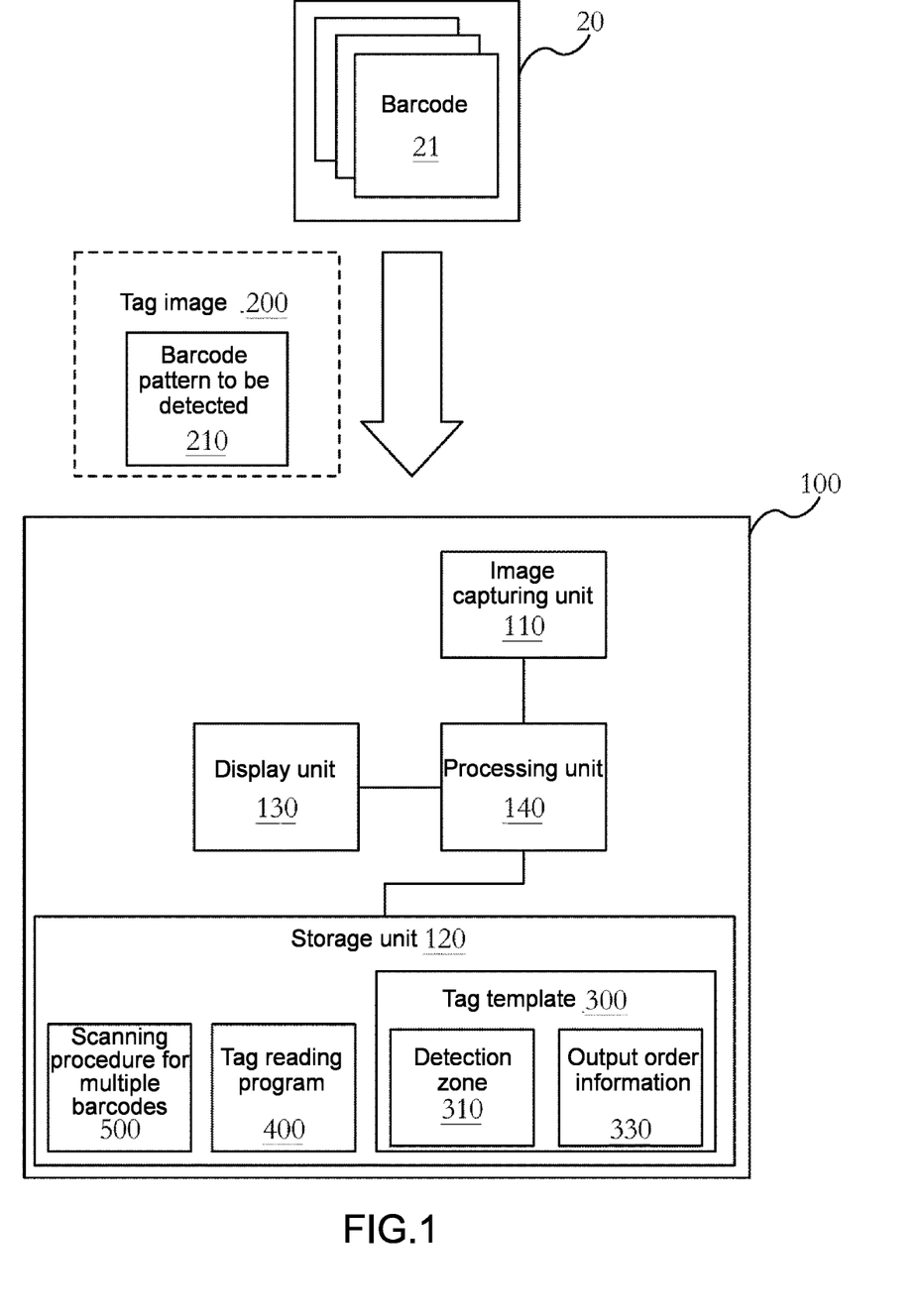
FIG. 1 is a schematic diagram of a system structure according to an embodiment.
Figure 2A:
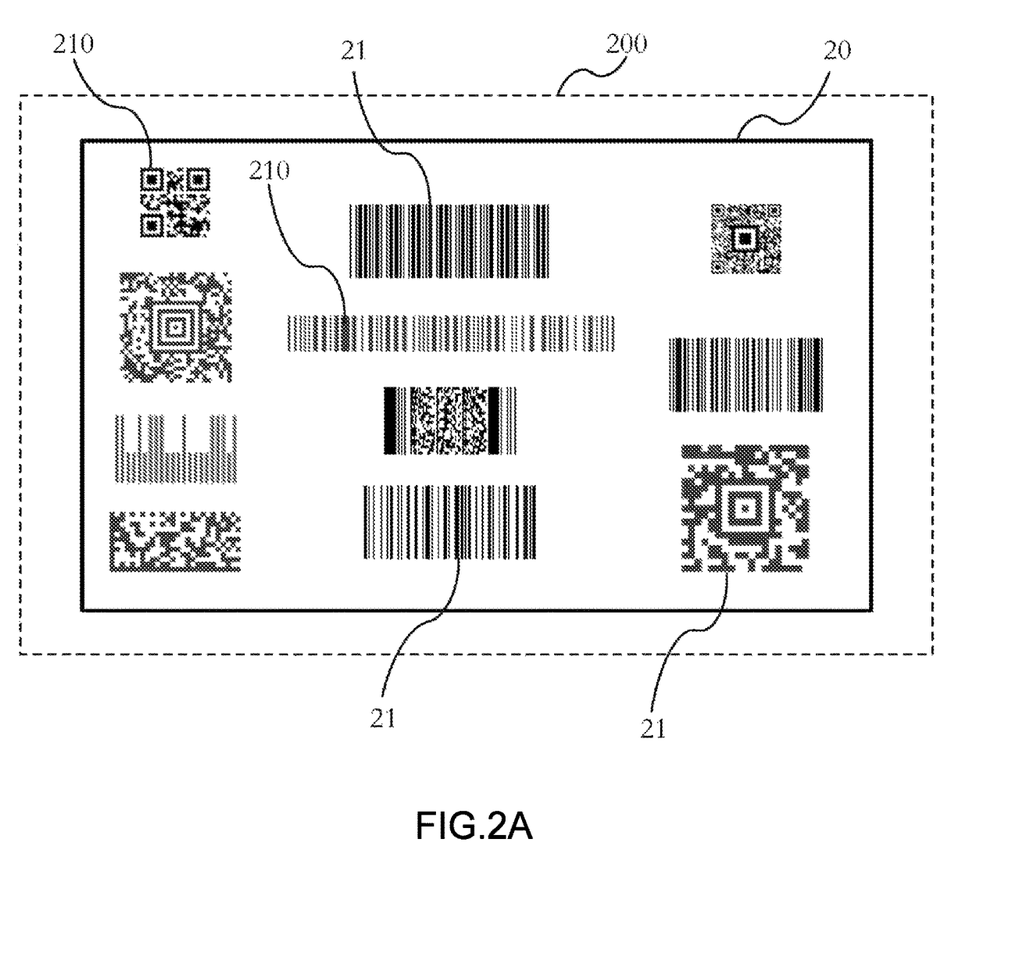
FIG. 2A is a schematic diagram of a tag image according to an embodiment.
Figure 2B:
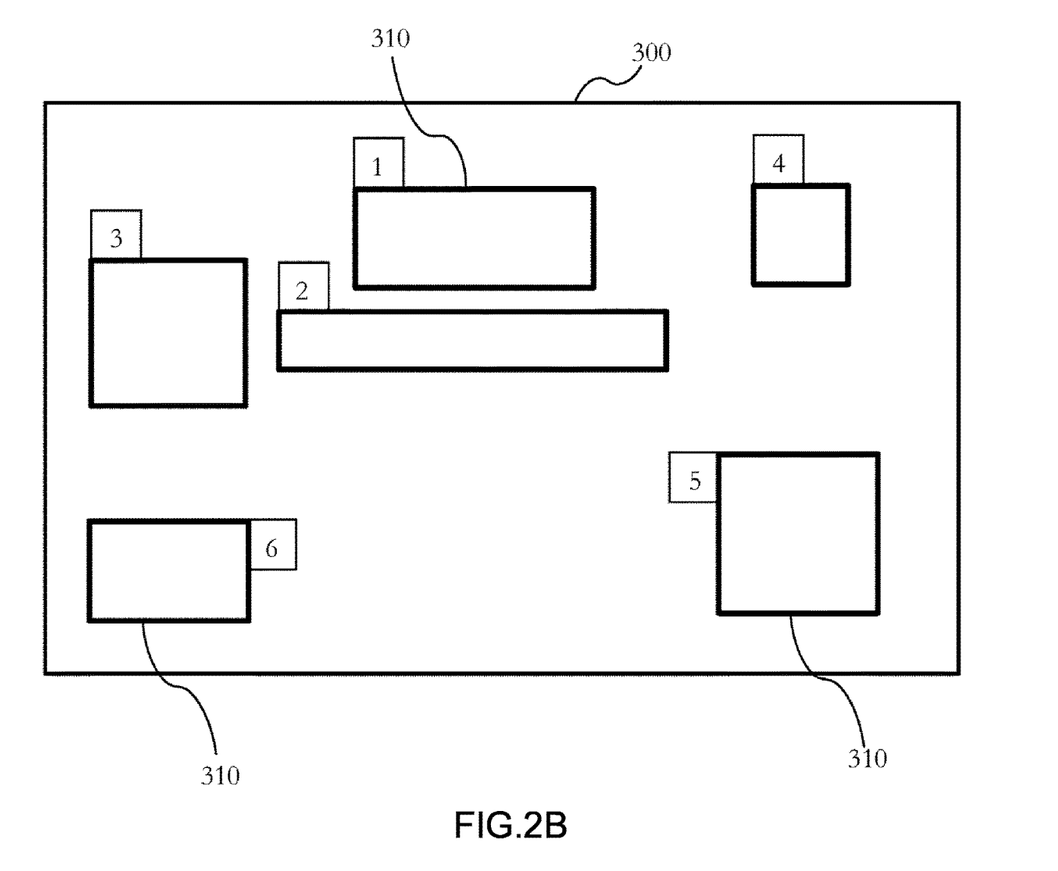
FIG. 2B is a schematic diagram of a tag template according to an embodiment.

Referring to FIG. 1, FIG. 2A and FIG. 2B, an electronic device for scanning multiple barcodes (hereinafter referred to as an electronic device 100) includes an image capturing unit 110, a storage unit 120, a display unit 130 and a processing unit 140. The processing unit 140 is electrically connected to the image capturing unit 110, the storage unit 120 and the display unit 130.

The image capturing unit 110 captures a tag 20 to acquire a tag image 200 of the tag 20. In some embodiments, the image capturing unit 110 may capture the tag 20 by means of video recording to acquire the tag image 200, or may capture the tag 20 by means of photographing to acquire one single tag image 200.

In one embodiment, the tag image 200 may be a real-time image currently captured by the image capturing unit 110; in other words, the tag image 200 is a real-time image. For example, when a scanning procedure 500 for multiple barcodes is executed, the processing unit 140 enables (or activates) the image capturing unit 110. The image capturing unit 110 generates the tag image 200 of the tag 20 by means of capturing the tag 20, and provides the tag image 200 currently captured to the processing unit 140. The processing unit 140 obtains the current tag image 200 and then analyzes the tag image 200 to obtain a barcode pattern 210 to be detected in the tag image 200 and coordinate information of the barcode pattern 210 to be detected on a 2D image coordinate system. In another embodiment, the tag image 200 may also be a digital image captured by the image capturing unit 110 in advance and stored in the storage unit 120. When the processing unit 140 executes the scanning procedure 500 for multiple barcodes, the processing unit 140 reads and obtains the tag image 200 from the storage unit 120.

The tag 20 has one or more barcodes 21. At this point in time, the tag image 200 of the tag 20 similarly has barcode patterns 210 to be detected of the barcodes 21. Since the barcode patterns 210 to be detected are images corresponding to the barcodes 21, barcode types of the barcode patterns 210 to be detected are the same as barcode types of the corresponding barcodes 21.

In some embodiments, the tag image 200 may include the barcode patterns 210 to be detected of the same or different barcode types, as shown in FIG. 2A. In other words, the barcodes 21 on the tag 20 may be coded by the same method (that is, having the same barcode type), or may be coded by different methods (that is, having different barcode types). Moreover, a portion of the barcodes 21 on the tag 20 may be coded by the same method (that is, having the same barcode type), or while another portion of the barcodes 21 may be coded by different methods (that is, having different barcode types). For example, the tag image 200 may simultaneously have the barcode patterns 210 to be detected 210 of one-dimensional barcodes (that is, the barcodes 21) and two-dimensional barcodes (that is, the barcodes 21). In some embodiments, the barcode types of the barcodes 21 and the barcode patterns 210 to be detected may be, for example but not limited to, any one-dimensional barcode (for example, Code 39 barcodes, interleaved 25 barcodes, EAN-13 barcodes, EAN-8 barcodes, or Code 128 barcodes) or any two-dimensional barcode (QR codes, PDF 417 codes, composite barcodes, or Data Matrix barcodes).

The storage unit 120 stores at least one tag template 300, a tag reading program 400 and the scanning procedure 500 for multiple barcodes. The tag template 300 has a plurality of detection zones 310, as shown in FIG. 2B. In the tag template 300, these detection zones 310 are in a non-overlapping arrangement (or configuration) from one another. In addition to being used to define positions of the barcode patterns 210 to be detected, the detection zones 310 are also used to identify whether the barcode patterns 210 to be detected are target barcodes. A barcode pattern that is to be identified and read by the detection zones 310 and has a predetermined target barcode type is referred to as a target barcode pattern (not denoted with numerals or symbols). In other words, each of the detection zones 310 corresponds to a configuration position and a target barcode type. The configuration position records coordinate information of the target barcode pattern in the tag image 200 to be detected, and the detection zone 310 is defined by the corresponding configuration position. The target barcode type records the type of coded barcode to which the target barcode belongs.

In some embodiments, the configuration position includes coordinate values (hereinafter referred to as corner coordinates) of a plurality of corners of the target barcode pattern on the image coordinate system and/or border lengths thereof. Each of the corner coordinates is a pixel position in the tag template 300. Since the tag template 300 is a plane image, the pixel distribution of an image of the tag template 300 may be regarded as a two-dimensional right-angle coordinate system (that is, the above image coordinate system). In other words, each of the corner coordinates is an absolute coordinate on the image coordinate system. In some embodiments, each target barcode pattern (that is, the barcode pattern 210 to be detected located in the detection zone 310) may be rectangular, and the coordinate information thereof may be absolute coordinates of a plurality of vertices of the target barcode pattern on the image coordinate system.

In some embodiments, in addition to being predetermined when shipped out of the factory, the tag template 300 may also be established by a user by means of operating the electronic device 100.

In some embodiments, the processing unit 140 executes a template establishment procedure by operating a template setting function of the tag reading program 400. In other words, during the establishing of the tag template 300, the processing unit 140 drives the image capturing unit 110 to capture the tag 20 to acquire the tag image 200 of the tag 20. Once the tag image 200 is obtained, the processing unit 140 displays the captured tag image 200 on the display unit 130. A user may select, by operating an operation interface of the electronic device 100 (for example, a touch function of the display unit 130), one or more barcode patterns 210 to be detected as a target barcode from the tag image 200 displayed by the display unit 130. When the selection is completed (for example, after a user clicks a confirm key on the operation interface), the processing unit 140 establishes, according to the selected detection zone 310 in which each target barcode is provided (that is, identifying the position of each target barcode in the tag image 200 and the barcode type of the target barcode to respectively generate a corresponding configuration position and the target barcode type, and generating the corresponding detection zone 310 based on each configuration position), a new tag template 300 (that is, having the generated detection zone 310) and stores the new tag template 300 in the storage unit 120. Thus, when a tag scanning function of the tag reading program 400 is operated, the processing unit 140 is able to perform identification for the barcode pattern 210 to be detected falling within each detection zone 310 in the tag image 200 according to the tag template 300.

Figure 3:
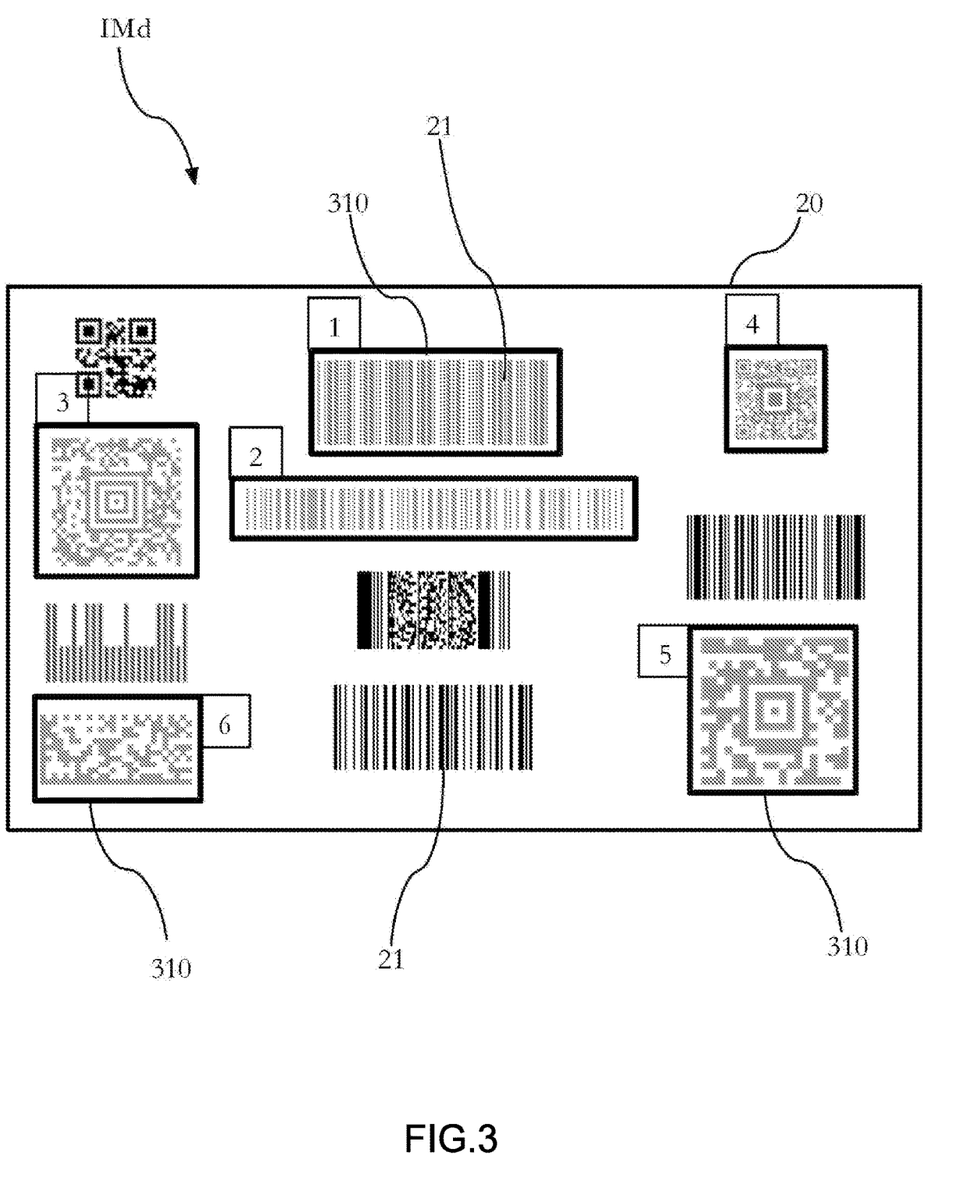
FIG. 3 is a schematic diagram of a combined image according to an embodiment.

In some embodiments, during the establishing of the tag template 300, the processing unit 140 further sequentially sets a serial number (as shown in FIG. 3) for the selected detection zone 310 according to the selection order of the target barcode, and generates output order information 330 according to the serial numbers of all the detection zones 310. Herein, the output order information 330 records the output order of information decoded from the barcode pattern 210 to be detected in the detection zone 310. In FIG. 3, the number in a thin line box represents the serial number of the detection zone 310. Moreover, the serial numbers of all the detection zones 310 are sequentially numbered according to the selection order of the target barcodes to indicate the output order thereof.

In some embodiments, the processing unit 140 operates the tag reading program 400 to execute the scanning procedure 500 for multiple barcodes so as to identify the captured tag image 200. Referring to FIG. 1 to FIG. 4, in the scanning procedure 500 for multiple barcodes, the processing unit 140 performs the following steps.

Figure 4:
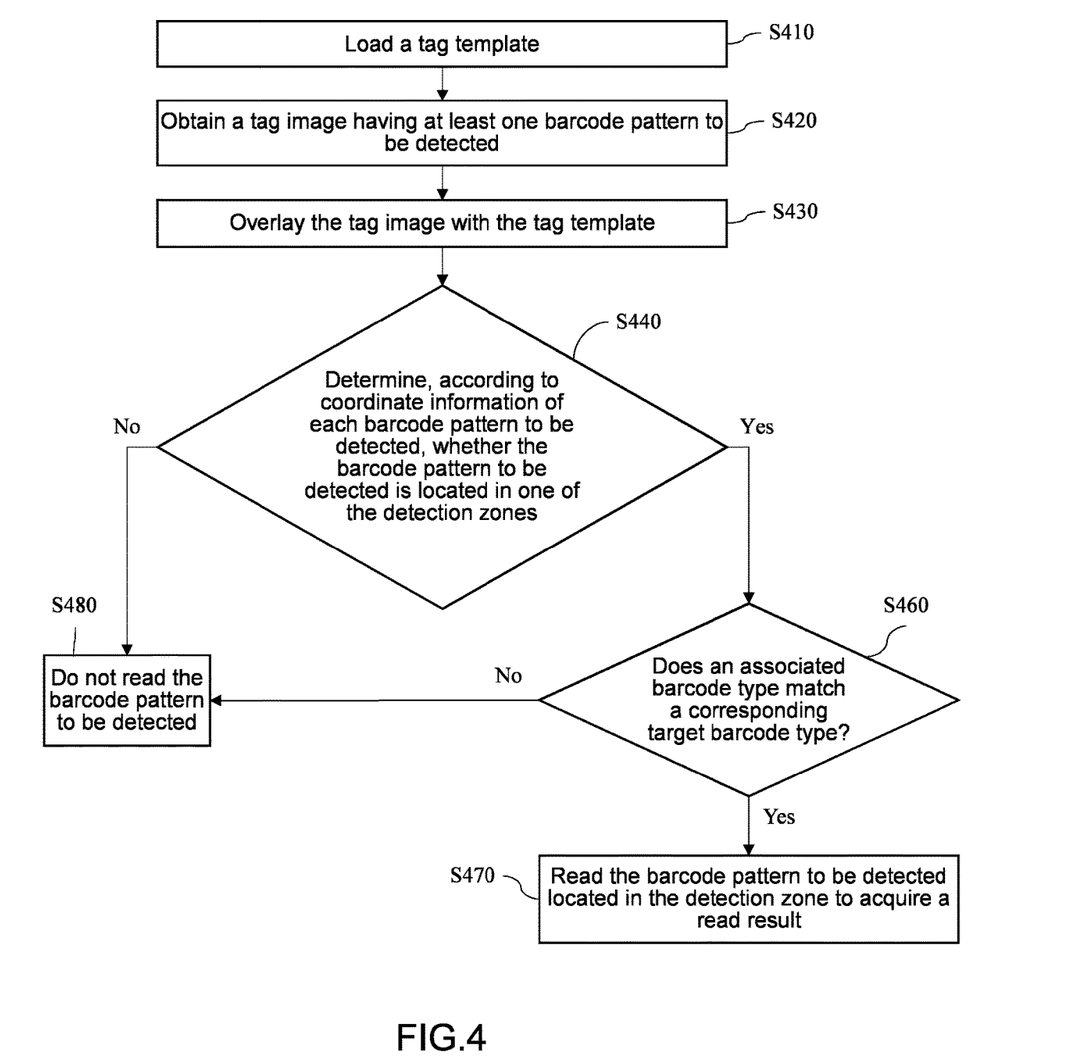
FIG. 4 is a schematic flowchart of a scanning method for multiple barcodes according to an embodiment.

In step S410, the processing unit 140 loads a tag template 300.

In step S420, the processing unit 140 obtains a tag image 200, which has at least one barcode pattern 210 to be detected, and each barcode pattern 210 to be detected has coordinate information on an image coordinate system.

In step S430, the processing unit 140 overlays the tag image 200 with the tag template 300.

In step S440, the processing unit 140 determines, according to the coordinate information, whether each barcode pattern 210 to be detected is located in one of the detection zones 310.

In step S460, if the barcode pattern 210 to be detected is located in one of the detection zones 310, the processing unit 140 further determines whether the barcode type (hereinafter as an associated barcode type) of the barcode pattern 210 to be detected matches a target barcode type corresponding to the located detection zone 310.

In step S470, if the associated barcode type of the barcode pattern 210 to be detected matches the target barcode type corresponding to the located detection zone 310, the processing unit 140 reads (or decodes) the barcode pattern 210 to be detected (that is, the target barcode pattern) located in the detection zone 310 to acquire a read result (that is, information represented by the barcode pattern 210 to be detected located in the detection zone 310).

In step S480, if the associated barcode type of the barcode pattern 210 to be detected does not match the target barcode type corresponding to the located detection zone 310, or the barcode pattern 210 to be detected is not located in one of the detection zones 310, the processing unit 140 does not read (or decode) the barcode pattern 210 to be detected located in the detection zone 310.

In some embodiments, referring to FIG. 1 to FIG. 3 and FIG. 5, in the scanning procedure 500 for multiple barcodes, the processing unit 140 performs the following steps after step S410 to step S440.

Figure 5:
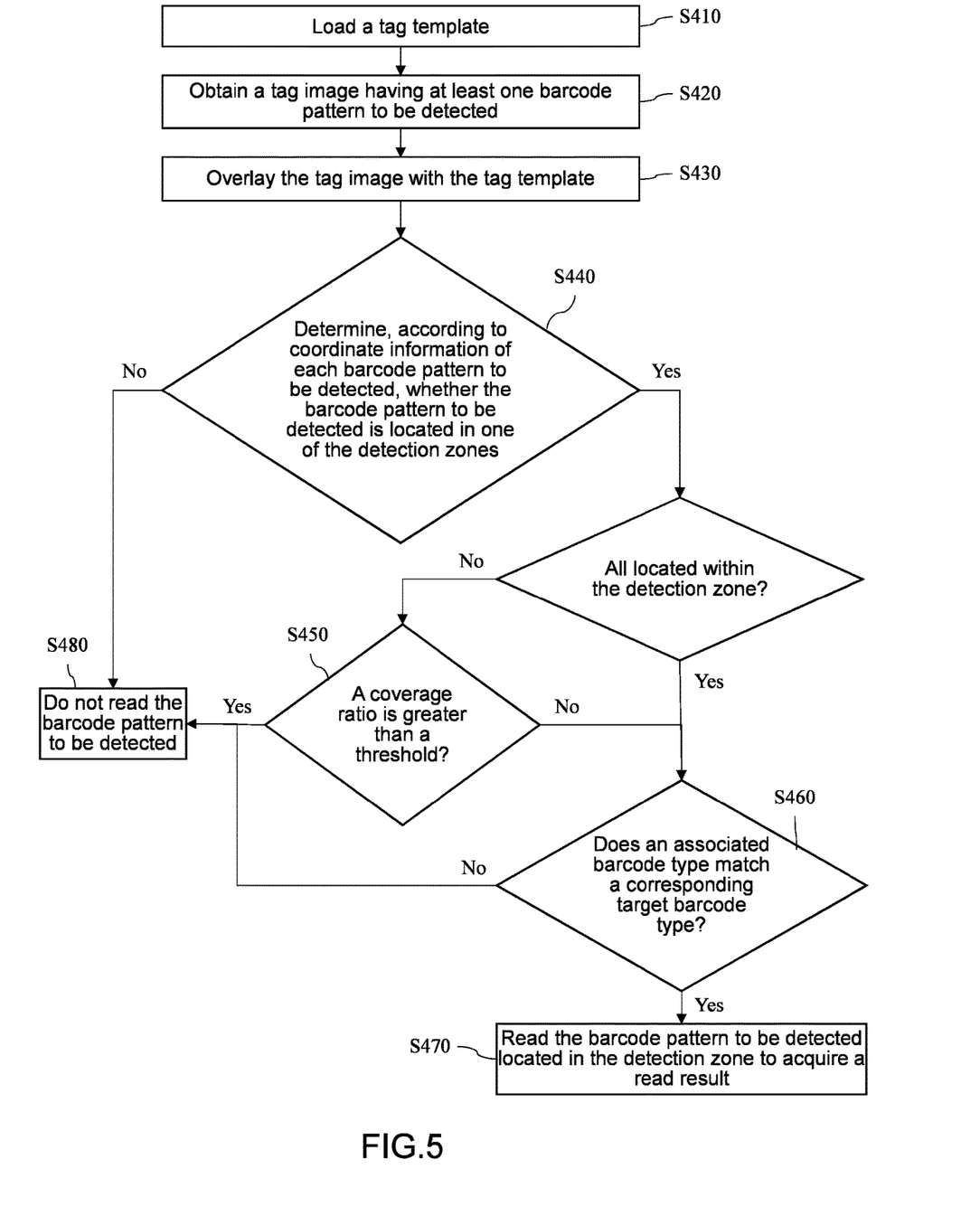
FIG. 5 is a schematic flowchart of a scanning method for multiple barcodes according to another embodiment.

In step S450, if a partial zone of the barcode pattern 210 to be detected is located in mone of the detection zones 310, the processing unit 140 determines whether a coverage ratio of the partial zone to the detection zone 310 is greater than a threshold.

In step S460, if the barcode pattern 210 to be detected is located in one of the detection zones 310 or the coverage ratio is greater than or equal to the threshold, the processing unit 140 further determines whether the barcode type (hereinafter as an associated barcode type) of the barcode pattern 210 to be detected matches the target barcode type corresponding to the located detection zone 310.

In step S470, if the associated barcode type of the barcode pattern 210 to be detected matches the target barcode type corresponding to the located detection zone 310, the processing unit 140 reads (or decodes) the barcode pattern 210 to be detected (that is, the target barcode pattern) located in the detection zone 310 to acquire a read result (that is, information represented by the barcode pattern 210 to be detected located in the detection zone 310).

In step S480, if the associated barcode type of the barcode pattern 210 to be detected does not match the target barcode type corresponding to the located detection zone 310, or the barcode pattern 210 to be detected is not located in one of the detection zones 310, or the coverage ratio is smaller than the threshold or the barcode pattern 210 to be detected is not located in the detection zone 310, the processing unit 140 does not read (or decode) the barcode pattern 210 to be detected located in the detection zone 310.

In some embodiments, referring to FIG. 1 to FIG. 6, in the scanning procedure 500 for multiple barcodes, the processing unit 140 performs the following steps after step S470.

Figure 6:
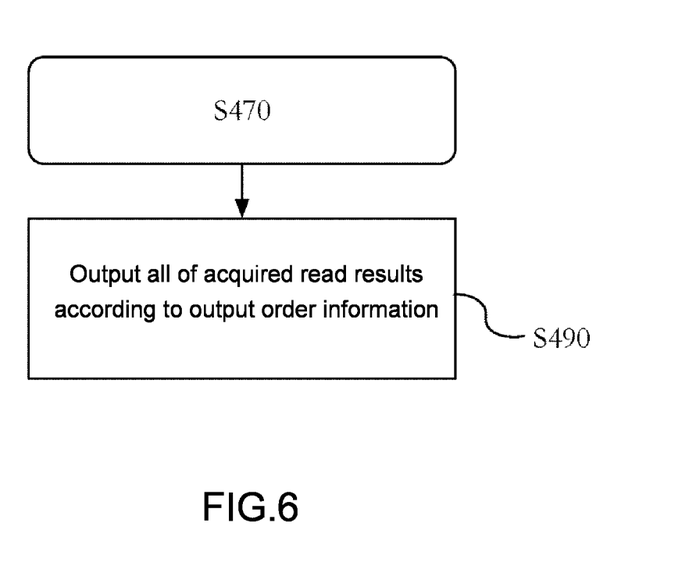
FIG. 6 is a schematic partial flowchart of a scanning method for multiple barcodes according to some embodiments.

In step S490, the processing unit 140 outputs all the acquired read results (that is, information represented by the barcode patterns 210 to be detected located in the detection zones 310) according to the output order information.

In some embodiments, first of all, a user selects the tag template 300 by the operation interface of the electronic device 100, so as to enable the processing unit 14 to read and load the selected tag template 300 from the storage unit 120 according to the selection. Then, the processing unit 140 enables the image capturing unit 110 to start capturing. When the image capturing unit 110 generates and provides the tag image 200 of the tag 20 by capturing the tag 20 to the processing unit 140, the processing unit 140 overlays the tag image 200 with the tag template 300, and at the same time displays on the display unit 130 a combined image IMd formed by overlaying of the tag image 200 with the tag template 300, as shown in FIG. 3.

Once the tag image 200 is acquired, the processing unit 140 analyzes the tag image 200 to identify all barcode patterns 210 to be detected in the tag image 200 and coordinate information (not shown) of each barcode pattern 210 to be detected. In some embodiments, the coordinate information of each barcode pattern 210 to be detected includes coordinate values (hereinafter referred to as corner coordinates) of a plurality of corners of the barcode pattern 210 to be detected on the image coordinate system and/or border lengths thereof. The corner coordinates correspond to pixel positions in the tag template 300. In other words, the corner coordinates are pixel positions on the corners of the barcode pattern 210 to be detected in the tag image 200 having the same display size as the tag template 300. Since the tag image 200 is a plane image, the pixel distribution of an image of the tag image 200 may be regarded as a two-dimensional right-angle coordinate system (that is, the above image coordinate system). In other words, the corner coordinate is an absolute coordinate of a corner of the barcode pattern 210 to be detected on the image coordinate system. In some embodiments, each barcode pattern 210 to be detected may be rectangular, and the coordinate information thereof may be absolute coordinates of a plurality of vertices of the barcode pattern 210 to be detected on the image coordinate system.

Thus, the coordinate in the coordinate information uses the tag template 300 as a reference. Moreover, during image capturing, the processing unit 140 overlays the tag image 200 with the tag template 300, and hence the coordinate values of each corner of the barcode pattern 210 to be detected in the tag image 200 can be mapped to the tag template 300. For example, assume that the image resolution of an image captured by the image capturing unit 110 is 1920*1080 (pixels), and an upper-left corner of the tag image 200 is an origin. Thus, the coordinate values of the four vertices of the tag image 200 are respectively (0, 0), (1920, 0), (0, 1080) and (1920, 1080). If the resolutions of the tag template 300 and the tag image 200 are the same, the processing unit 140 may directly overlay the tag image 200 with the tag template 300.

If the resolutions of the tag template 300 and the tag image 200 are different, the processing unit 140 first scales up or scales down the tag image 200. In continuation of the above example, assume that the size of the tag template 300 is 1280*720 (pixels). The processing unit 140 can acquire an image ratio according to the tag image 200 and the tag template 300. In other words, the processing unit 140 calculates an image length ratio according to the lengths of the tag image 200 and the tag template 300, and calculates an image width ratio according to widths of the tag image 200 and the tag template 300, with reference to the following equations (in continuation of the above example):

$$\text{image length ratio (width\_ratio)}=1280/1920;$$

$$\text{image width ratio (height\_ratio)}=720/1080.$$

Taking the pixel coordinates of four vertices as the corner coordinates for example, the processing unit 140 calculates converted corner coordinates (corresponding to original corner coordinates of four vertices) of four vertices of each barcode pattern 210 to be detected according to the image length ratio and the image width ratio. The processing unit 140 determines, according to the converted corner coordinates of each barcode pattern 210 to be detected and a corner coordinate set of the detection zones 310 of the tag template 300, whether the barcode pattern 210 to be detected is located in one of the detection zones 310. In general, when the converted corner coordinates of the barcode pattern 210 to be detected are all located in the same detection zone 310, the processing unit 140 reads (that is, decode) the barcode pattern 210 to be detected located in the detection zone 310 according to the target barcode type of the detection zone 310, so as to acquire information (that is, a read result) represented by the barcode pattern 210 to be detected.

More specifically, when the converted corner coordinates of the barcode pattern 210 to be detected are all located in the same detection zone 310, the processing unit 140 first determines whether the associated barcode type of the barcode pattern 210 to be detected matches the target barcode type corresponding to the located detection zone 310. If the target barcode type of the detection zone 310 matches the associated barcode type of the barcode pattern 210 to be detected, the processing unit 140 reads the barcode pattern 210 to be detected and outputs the read result of the barcode pattern 210 to be detected. Conversely, if not, the processing unit 140 does not read the barcode pattern 210 to be detected. In some embodiments, when the barcode pattern 210 to be detected is not located in one of the detection zones 310 or the barcode type does not match, in addition to not reading the barcode pattern 210 to be detected, the processing unit 140 may further output an error message to remind a user that the barcode pattern 210 to be detected cannot be correctly identified.

In some embodiments, when the coordinate information of the barcode pattern 210 to be detected is corner coordinates of a plurality of corners, during the scanning process of the barcode pattern 210 to be detected, the processing unit 140 may determine, according to positions at which the corner coordinates of each corner fall in the coordinate information of the barcode pattern 210 to be detected, whether the barcode pattern 210 to be detected is located in the detection zone 310. Take the coordinate information as coordinate values of four vertices on the image coordinate system of the tag template 300 for example. If the coordinate values of the four vertices of the barcode pattern 210 to be detected are all located in the same detection zone 310, the processing unit 140 can directly read the barcode pattern 210 to be detected. If the coordinate values of any of the four vertices of the barcode pattern 210 to be detected do not fall in the detection zone 310, the processing unit 140 calculates a coverage ratio of a partial zone of the barcode pattern 210 to be detected located in the detection zone 310, and determines whether the calculated coverage ratio is greater than a threshold. The coverage ratio is the size of an overlapping area between the barcode pattern 210 to be detected and the detection zone 310. In general, the value of the coverage ratio may be regarded as a barcode tolerance. A larger coverage ratio indicates that more parts of the barcode pattern 210 to be detected can be identified, and so the error correction capability of the tag reading program 400 is higher. The threshold may be determined, preset and stored in the storage unit 120 according to the target barcode type of a target barcode to be detected in all the detection zones 310.

When the coverage ratio is smaller than the threshold, the processing unit 140 does not read the barcode pattern 210 to be detected, and even outputs an error message to remind a user that the barcode pattern 210 to be detected cannot be correctly identified. When the coverage ratio is greater than or equal to the threshold, the processing unit 140 identifies a portion of the barcode pattern 210 to be detected located in the detection zone 310. At this point in time, the processing unit 140 first determines whether the associated barcode type of the barcode pattern 210 to be detected matches the target barcode type corresponding to the detection zone 310, and reads the barcode pattern 210 to be detected, so as to acquire a read result of the barcode pattern 210 to be detected.

In case of a plurality of barcode patterns 210 to be detected overlapping the detection zone 310 (that is, located in the detection zone 310), the processing unit 140 repeats the above determination logic so as to read all the barcode patterns 210 to be detected located in the detection zone 300.

In some embodiments, if there are many groups of barcode patterns 210 to be detected in the tag image 200 and there are a plurality of barcode patterns 210 to be detected located in the detection zone 310, the processing unit 140 may perform identification sequentially on the detection zone 310 according to the output order information of the tag template 300.

In some embodiments, if there are many groups of barcode patterns 210 to be detected in the tag image 200 and there are a plurality of barcode patterns 210 to be detected located in the detection zone 310, after reading all of the barcode patterns 210 to be detected located in the detection zone 310, the processing unit 140 may sequentially output the read results of barcode patterns 210 to be detected according to the output order information 330 of the tag template 300.

In some embodiments, the processing unit 140 uses the read order of the barcode pattern 210 to be detected as the write order of the read result. To clearly describe the read order, refer to the tag template 300 shown in FIG. 2B. The serial numbers of the detection zones 310 in FIG. 2B represent the output order of the detection zones 310. Further speaking, the processing unit 140 reads in a first-in-first-out manner the read result of the barcode pattern 210 to be detected according to the serial number of the detection zone 310 and writes the read result to the storage unit 120, and then sequentially outputs and displays the read result of each barcode pattern 210 to be detected on the display unit 130.

In some embodiments, when the scanning procedure 500 for multiple barcodes of the tag reading program 400 is executed, if an identification error occurs in one of the detection zones 310, the processing unit 140 may skip the detection zone 310 with the error, and continue the identification of the barcode pattern 210 to be detected for the detection zone 310 of the next serial number.

Figure 7:
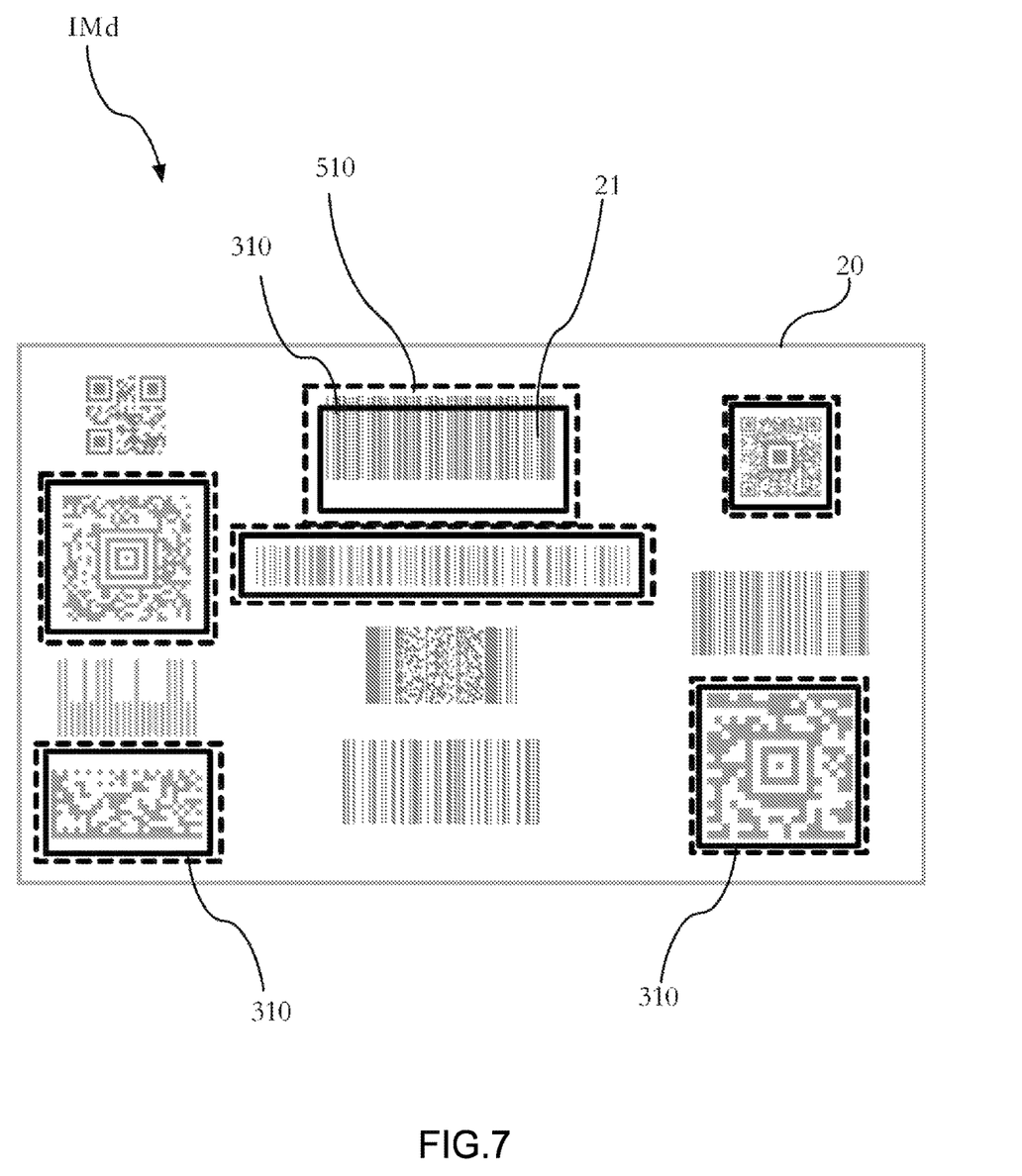
FIG. 7 is a schematic diagram of a combined image according to another embodiment.

In some embodiments, the processing unit 140 may adjust the detection range of each detection zone 310, so as to enhance the identification success rate in case of swaying of the electronic device 100. In general, referring to FIG. 3 and FIG. 7, a solid line box in FIG. 7 represents an original detection range of the detection zone 310 (hereinafter referred to as an original detection zone 310), and a dotted line box outside the detection zone 310 is an expanded detection zone (hereinafter referred to as an expanded detection zone 510).

In some embodiments, in the above determination steps (that is, step S440 and step S450), the processing unit 140 may perform determination based on the original detection zone of the detection zone 310. More specifically, in step S440, the processing unit 140 determines whether the coordinate information of the barcode pattern 210 to be detected falls within the original detection zone 310. In step S450, the processing unit 140 calculates the coverage ratio based on the barcode pattern 210 to be detected and the original detection zone of the detection zone 310, and compares the coverage ratio with the threshold.

In some other embodiments, in the above determination steps (that is, step S440 and step S450), the processing unit 140 may also perform determination based on the expanded detection zone 510 of the detection zone 310. More specifically, in step S440, the processing unit 140 determines whether the coordinate information of the barcode pattern 210 to be detected falls within the expanded detection zone 510. In step S450, the processing unit 140 calculates the coverage ratio based on the barcode pattern 210 to be detected and the expanded detection zone 510 of the detection zone 310, and compares the coverage ratio with the threshold. When the barcode pattern 210 to be detected is located in the expanded detection zone 510, the processing unit 140 reads the content of the barcode pattern 210 to be detected according to the target barcode type corresponding to the detection zone 310 to acquire a read result. In other words, as shown in FIG. 7, even if the barcode pattern 210 to be detected is located between the detection zone 310 and the expanded detection zone 510, the processing unit 140 is also able to read the barcode pattern 210 to be detected according to the target barcode type of the detection zone 310 and generate a corresponding read result.

In some embodiments, in the overlaying step (that is, step S430), before displaying, the processing unit 140 adjusts a brightness level of a partial area in the combined image IMd, so as to emphasize the detection zone 310 in which the barcode pattern 210 to be detected can be read. In some embodiments, a brightness level of the detection zones 310 in which all barcode patterns 210 to be detected that match the corresponding target barcode type in the combined image IMd are located is higher than a brightness level of a remaining area in the combined image IMd. In other words, the processing unit 140 reduces a brightness level of a remaining area in the combined image IMd compared to the detection zones 310 in which all barcode patterns 210 to be detected that match the corresponding target barcode type in the combined image IMd are located. For example, in the combined image IMd, parts other than the detection zone 310 where the barcode pattern 210 to be detected (that is, the target barcode pattern) is located can be in a grayscale image for differentiation purposes.

In some embodiments, the electronic device 100 may be, for example but not limited to, a mobile phone, a tablet computer, a personal computer, a laptop computer or a barcode scanner.

In some embodiments, the image capturing unit 110 may be implemented by a combination of a camera lens, a lens and an image processor.

In some embodiments, the storage unit 120 may be implemented by one or more memories, each of which may be, for example but not limited to, a memory or a register.

In some embodiments, the display unit 130 may be, for example but not limited to, a touch screen or a common display screen (without a touch function).

In some embodiments, the processing unit 140 may be implemented by one or more processors, each of which may be, for example but not limited to, a central processing unit (CPU), a system-on-chip (SoC), a general purpose or application specific microprocessor, a digital signal processor (DSP), a programmable logic controller (PLC), an application specific integrated circuit (ASIC), a programmable logic device (PLD) or a similar processing device, or a combination of these devices.

In some embodiments, the scanning method for multiple barcodes according to any embodiment may be implemented by a computer program product. In other words, the scanning method for multiple barcodes according to any embodiment can be completed when the electronic device 100 loads and executes the tag reading program 400 including a plurality of program codes. In some embodiments, the computer program product may be a readable recording medium, and the above program may be stored in the readable recording medium so as to be loaded by the electronic device 100. In some embodiments, the above program may be a computer program product, and may be transmitted in a wired or wireless manner into the electronic device 100.

Figure 8:
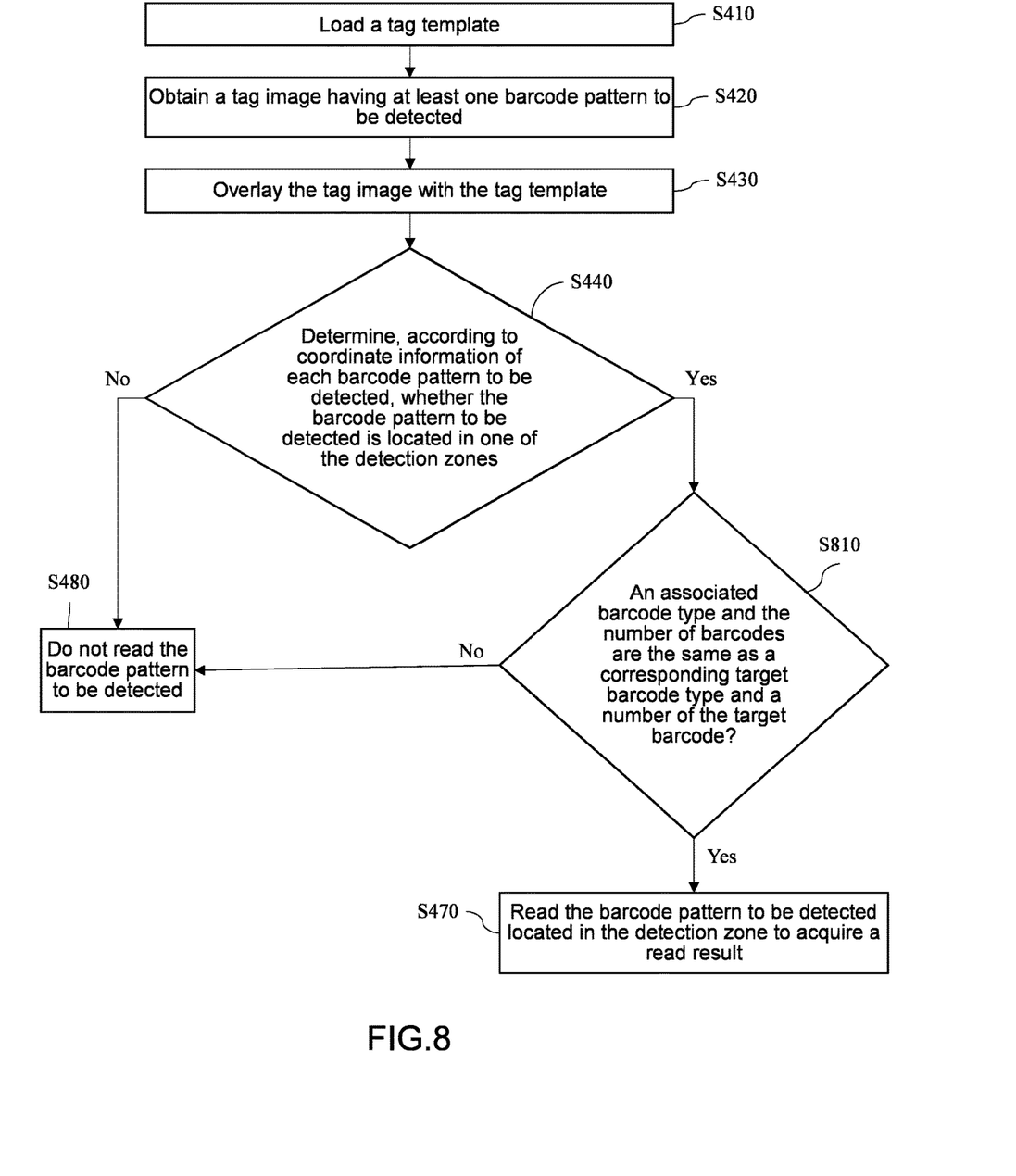
FIG. 8 is a schematic flowchart of a scanning method for multiple barcodes according to an embodiment.

In some embodiments, the processing unit 140 at the same time determines the number of barcodes of the barcode pattern 210 to be detected while performing step S460. Refer to FIG. 8. When the processing unit 140 executes the scanning procedure 500 for multiple barcodes, the processing unit 140 performs the following steps.

In step S410, the processing unit 140 loads a tag template 300.

In step S420, the processing unit 140 obtains a tag image 200, which has at least one barcode pattern 210 to be detected, and each barcode pattern 210 to be detected has coordinate information on an image coordinate system.

In step S430, the processing unit 140 overlays the tag image 200 with the tag template 300.

In step S440, the processing unit 140 determines, according to the coordinate information, whether each barcode pattern 210 to be detected is located in one of the detection zones 310.

In step S810, if the barcode pattern 210 to be detected located in the detection zone 310 does not match the corresponding target barcode type, and the number of barcodes of the barcode pattern 210 to be detected does not match a number of the corresponding target barcode, the processing unit 140 does not read the barcode pattern 210 to be detected located in the detection zone 310.

In step S470, if the associated barcode type of the barcode pattern 210 to be detected matches the target barcode type corresponding to the located detection zone 310, the processing unit 140 reads the barcode pattern 210 to be detected located in the detection zone 310 to acquire a read result.

In step S480, if the associated barcode type of the barcode pattern 210 to be detected does not match the target barcode type corresponding to the located detection zone 310, or the barcode pattern 210 to be detected is not located in one of the detection zones 310, the processing unit 140 does not read the barcode pattern 210 to be detected located in the detection zone 310.

First of all, the processing unit 140 performs steps S410 to S440, and the operation details of steps S410 to S440 can be referred from the above description. In addition to determining whether the barcode type of the barcode pattern 210 to be detected in the detection zone 310 and the target code type are the same, the processing unit 140 further determines whether the number of barcodes of the barcode pattern 210 to be detected is the same as the number of barcodes of the target barcode (corresponding to step S810).

If both of the barcode type and the number of barcodes of the barcode pattern 210 to be detected0 are the same as the barcode type and the number of barcodes of the target barcode, the processing unit 140 reads the barcode pattern 210 to be detected located in the detection zone 310 and acquires a corresponding read result (refer to the processing details of step S470 in the description above). If not, the processing unit 140 does not perform the related processing of reading on the barcode pattern 210 to be detected (refer to the processing details of step S480 in the description above). The processing unit 140 may drive the display unit 130 to play a message related to a read error so as to provide a reminder for the user.

In some embodiments, referring to FIG. 1 to FIG. 3, FIG. 8 and FIG. 9, in the scanning procedure 500 for multiple barcodes, the processing unit 140 performs the following steps after step S440.

Figure 9:
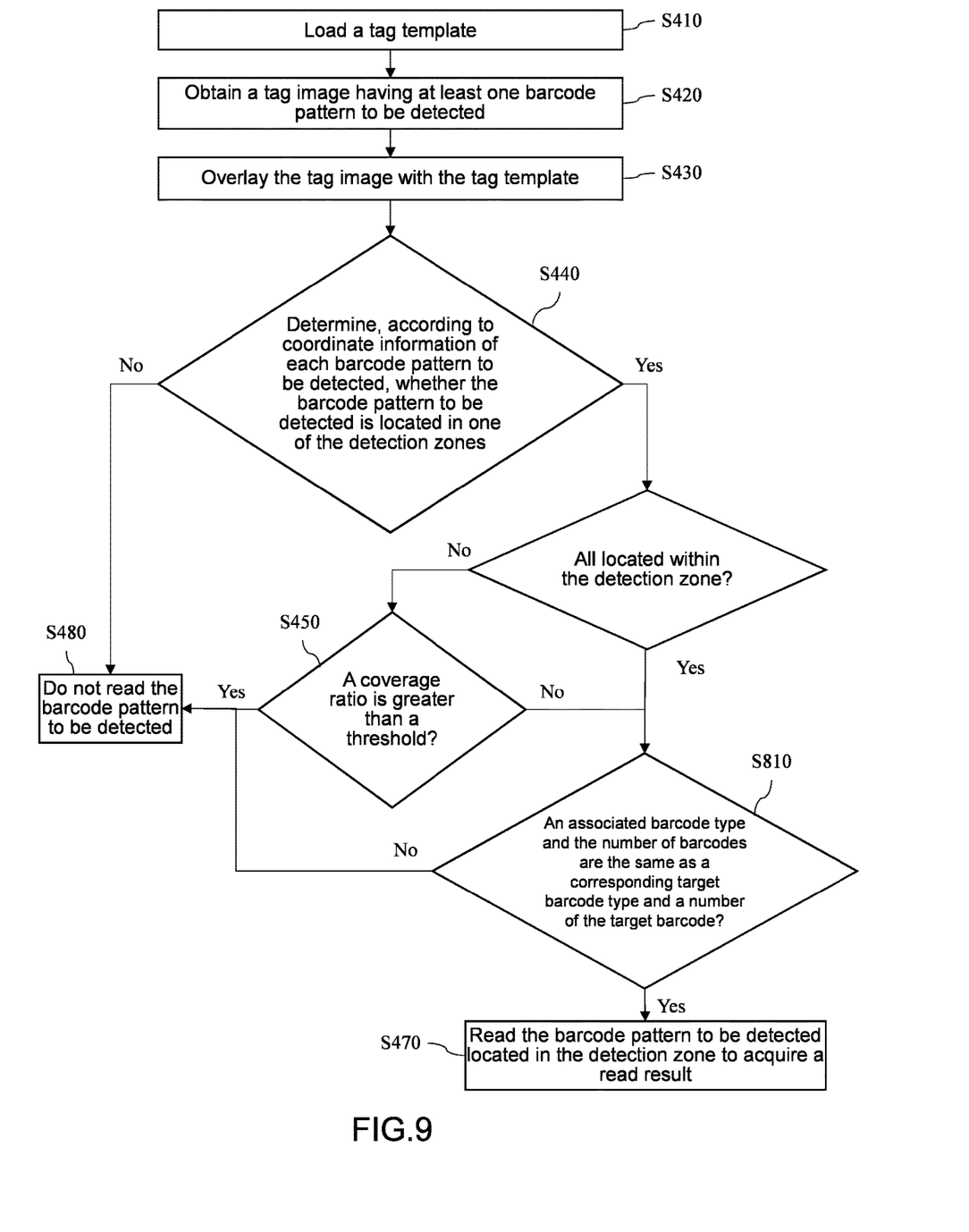
FIG. 9 is a schematic flowchart of a scanning method for multiple barcodes according to another embodiment.

In step S450, if a partial zone of the barcode pattern 210 to be detected is located in one of the detection zones 310, the processing unit 140 determines whether a coverage ratio of the partial zone to the detection zone 310 is greater than a threshold.

In step S810, if the barcode pattern 210 to be detected located in the detection zone 310 does not match the corresponding target barcode type, and the number of barcodes of the barcode pattern 210 to be detected does not match a number of the corresponding target barcode, the processing unit 140 does not read the barcode pattern 210 to be detected located in the detection zone 310.

In step S470, if the associated barcode type of the barcode pattern 210 to be detected matches the target barcode type corresponding to the located detection zone 310, the processing unit 140 reads the barcode pattern 210 to be detected located in the detection zone 310 to the acquire a read result.

In step S480, if the associated barcode type of the barcode pattern 210 to be detected does not match the target barcode type corresponding to the located detection zone 310, or the barcode pattern 210 to be detected is not located in one of the detection zones 310, or the coverage ratio is smaller than the threshold or the barcode pattern 210 to be detected is not located in the detection zone 310, the processing unit 140 does not read the barcode pattern 210 to be detected located in the detection zone 310.

When the scanning procedure 500 for multiple barcodes determines that the barcode pattern 210 to be detected is not located in the detection zone 310, the coverage ratio of the barcode pattern 210 to be detected is smaller than the threshold, or the barcode type of the barcode pattern 210 to be detected is different or the number of barcodes of the barcode pattern 210 to be detected does not match, the processing unit 140 does not read the barcode pattern 210 to be detected (corresponding to step S810).

In conclusion, the scanning method, the electronic device 100 and the processing system for multiple barcodes of any of the embodiments provide a function of simultaneously scanning multiple barcodes by using the tag template 300, so as to generate a read result of a barcode with absolute coordinates matching the detection zone 310 and a format matching a corresponding target barcode type. In some embodiments, the scanning method, the electronic device 100 and the processing system for multiple barcodes are further capable of setting the output order of each detection zone 310 in the tag template 300 and accordingly outputting the generated read result.

What is claimed is:

1. A scanning method for multiple barcodes, comprising:
   loading a tag template, the tag template having a plurality of detection zones each corresponding to a target barcode type;
   capturing a tag by an image capturing unit to obtain a tag image, wherein the tag image has at least one barcode pattern to be detected, and each barcode pattern to be detected has coordinate information on an image coordinate system;
   overlaying the tag image with the tag template, and determining, according to the coordinate information of each barcode pattern to be detected, whether the barcode pattern to be detected is located in one of the detection zones,
   wherein overlaying the tag image comprises:
   selecting a reference point from the tag image;
   selecting a corresponding point from the tag template according to the reference point;
   acquiring a scaling ratio;
   adjusting a range in which the tag image is overlaid with the tag template; and
   mapping the corresponding point to the reference point such that the tag image is overlaid with the tag template; and
   if the barcode pattern to be detected is located in one of the detection zones and matches the corresponding target barcode type, reading the barcode pattern to be detected located in the detection zone to acquire a read result.

2. The scanning method for multiple barcodes according to claim 1, wherein the coordinate information includes a plurality of corner coordinates of the barcode pattern to be detected on the image coordinate system.

3. The scanning method for multiple barcodes according to claim 1, the tag template further having output order information of the plurality of detection zones, the scanning method for multiple barcodes further comprising:
   outputting all of the acquired read results according to the output order information.

4. The scanning method for multiple barcodes according to claim 1, further comprising:
   if the barcode pattern to be detected located in the detection zone does not match the corresponding target barcode type, not reading the barcode pattern to be detected located in the detection zone.

5. The scanning method for multiple barcodes according to claim 1, further comprising:
   if a partial zone of the barcode pattern to be detected is located in the detection zone, determining whether a coverage ratio of the partial zone to the detection zone is greater than a threshold; and
   if the coverage ratio is greater than or equal to the threshold and the barcode pattern to be detected located in the detection zone matches the corresponding target barcode type, reading the barcode pattern to be detected located in the detection zone to acquire the read result.

6. The scanning method for multiple barcodes according to claim 1, further comprising:
   if the barcode pattern to be detected located in the detection zone does not match the corresponding target barcode type, and a number of barcodes of the barcode pattern to be detected does not match a number of the corresponding target barcode, not reading the barcode pattern to be detected located in the detection zone.

7. The scanning method for multiple barcodes according to claim 1, further comprising:
   displaying a combined image formed by the tag image overlaid with the tag template.

8. The scanning method for multiple barcodes according to claim 7, wherein a brightness level of the detection zone in which all of the barcode pattern to be detected that matches the corresponding target barcode type in the combined image is located is higher than a brightness level of a remaining area in the combined image.

9. An electronic device for scanning multiple barcodes, comprising:
   an image capturing unit, capturing a tag to obtain a tag image, wherein the tag image has at least one barcode pattern to be detected, and each barcode pattern to be detected has coordinate information on an image coordinate system;
   a storage unit, storing a tag template and a tag reading program, wherein the tag template has a plurality of detection zones each corresponding to a target barcode type; and
   a processing unit, electrically connected to the image capturing unit and the storage unit, the processing unit operating the tag reading program so as to overlay the tag image with the tag template, determine, according to the coordinate information of each barcode pattern to be detected, whether the barcode pattern to be detected is located in one of the detection zones, and if the barcode pattern to be detected is located in one of the detection zones and matches the corresponding target barcode type, decode the barcode pattern to be detected located in the detection zone to acquire a read result;
   wherein, if a partial zone of the barcode pattern to be detected is located in the detection zone, the processing unit is configured to further determine whether a coverage ratio of the partial zone to the detection zone is greater than a threshold, and if the coverage ratio is greater than or equal to the threshold and the barcode pattern to be detected located in the detection zone matches the corresponding target barcode type, decode the barcode pattern to be detected located in the detection zone to obtain the read result, the processing unit overlays the tag image with the tag template by selecting a reference point from the tag image, selecting a corresponding point from the tag template according to the reference point, and mapping the corresponding point to the reference point, the processing unit overlays the tag image with the tag template by obtaining a scaling ratio and adjusting a range in which the tag image is overlaid with the tag template according to the scaling ratio.

10. The electronic device for scanning multiple barcodes according to claim 9, wherein the coordinate information includes a plurality of corner coordinates of the barcode pattern to be detected on the image coordinate system.

11. The electronic device for scanning multiple barcodes according to claim 9, wherein if the barcode pattern to be detected located in the detection zone does not match the corresponding target barcode type, the processing unit does not decode the barcode pattern to be detected located in the detection zone.

12. The electronic device for scanning multiple barcodes according to claim 9, wherein if a partial zone of the barcode pattern to be detected is located in the detection zone, the processing unit is configured to further determine whether a coverage ratio of the partial zone to the detection zone is greater than a threshold, and if the coverage ratio is greater than or equal to the threshold and the barcode pattern to be detected located in the detection zone matches the corresponding target barcode type, decode the barcode pattern to be detected located in the detection zone to obtain the read result.

13. The electronic device for scanning multiple barcodes according to claim 9, wherein if the barcode pattern to be detected located in the detection zone does not match the corresponding target barcode type, and a number of barcodes of the barcode pattern to be detected does not match a number of corresponding target barcode, the processing unit does not decode the barcode pattern to be detected located in the detection zone.

14. A processing system for scanning multiple barcodes, comprising:
a processing unit, configured to perform:
reading a tag template, wherein the tag template has a plurality of detection zones each corresponding to a target barcode type;
overlaying a tag image with the tag template;
obtaining and analyzing the tag image to obtain at least one barcode pattern to be detected in the tag image, wherein each barcode pattern to be detected has coordinate information on an image coordinate system;
detecting the coordinate information and an associated barcode type of each of the barcode pattern to be detected according to the plurality of detection zones and the target barcode type corresponding to each of the detection zones, so as to identify, from the at least one barcode pattern to be detected, at least one barcode pattern to be detected located in one of the detection zones and having an associated barcode type that matches the target barcode type of the located detection zone, as at least one target barcode pattern, wherein if a partial zone of the barcode pattern to be detected is located in the detection zone, the processing unit is configured to further determine whether a coverage ratio of the partial zone to the detection zone is greater than a threshold, and if the coverage ratio is greater than or equal to the threshold and the barcode pattern to be detected located in the detection zone matches the corresponding target barcode type, decode the barcode pattern to be detected located in the detection zone to obtain the read result, the processing unit overlays the tag image with the tag template by selecting a reference point from the tag image, selecting a corresponding point from the tag template according to the reference point, and mapping the corresponding point to the reference point, the processing unit overlays the tag image with the tag template by obtaining a scaling ratio and adjusting a range in which the tag image is overlaid with the tag template according to the scaling ratio;
decoding the at least one target barcode pattern to acquire information represented by each of the target barcode pattern; and
outputting all the acquired information.

* * * * *